US007456388B2

(12) United States Patent
Loboda et al.

(10) Patent No.: US 7,456,388 B2
(45) Date of Patent: Nov. 25, 2008

(54) ION GUIDE FOR MASS SPECTROMETER

(75) Inventors: Alexandre V. Loboda, Toronto (CA); Igor Chernushhevich, Ontario (CA)

(73) Assignee: MDS Inc., Concord, Ontario ( * ) Notice: Subject to any disclaimer, the term of this patent is extended or adjusted under 35 U.S.C. 154(b) by 262 days.

(21) Appl. No.: 11/122,034

(22) Filed: May 5, 2005

(65) Prior Publication Data

US 2005/0247872 A1 Nov. 10, 2005

Related U.S. Application Data

(60) Provisional application No. 60/567,817, filed on May 5, 2004.

(51) Int. Cl.
*B01D 59/44* (2006.01)

(52) U.S. Cl. ....................... 250/281; 250/282; 250/287; 250/288; 250/292; 250/396 R

(58) Field of Classification Search ................. 476/173; 250/287, 282, 292, 288, 281, 396 R
See application file for complete search history.

(56) References Cited

U.S. PATENT DOCUMENTS

| | | | | |
|---|---|---|---|---|
| 5,569,917 | A * | 10/1996 | Buttrill et al. | 250/292 |
| 5,689,111 | A * | 11/1997 | Dresch et al. | 250/287 |
| 5,729,014 | A * | 3/1998 | Mordehai et al. | 250/282 |
| 5,905,258 | A * | 5/1999 | Clemmer et al. | 250/287 |
| 6,011,259 | A * | 1/2000 | Whitehouse et al. | 250/287 |
| 6,111,250 | A | 8/2000 | Thomson et al. | |
| 6,121,607 | A * | 9/2000 | Whitehouse et al. | 250/288 |
| 6,188,066 | B1 * | 2/2001 | Whitehouse et al. | 250/288 |
| 6,285,027 | B1 | 9/2001 | Chernushevich et al. | |
| 6,288,394 | B1 | 9/2001 | Barnes et al. | |
| 6,380,666 | B1 | 4/2002 | Kawato | |
| 6,545,268 | B1 | 4/2003 | Verentchikov et al. | |
| 6,621,073 | B1 | 9/2003 | Dresch | |
| 6,657,190 | B2 * | 12/2003 | Hanson et al. | 250/287 |
| 6,670,606 | B2 * | 12/2003 | Verentchikov et al. | 250/287 |
| 6,683,301 | B2 * | 1/2004 | Whitehouse et al. | 250/288 |
| 6,700,117 | B2 * | 3/2004 | Franzen | 250/287 |
| 6,703,607 | B2 | 3/2004 | Stott et al. | |
| 6,744,043 | B2 * | 6/2004 | Loboda | 250/287 |
| 6,770,872 | B2 * | 8/2004 | Bateman et al. | 250/281 |
| 6,777,671 | B2 * | 8/2004 | Doroshenko | 250/287 |
| 6,794,640 | B2 | 9/2004 | Bateman et al. | |
| 6,835,928 | B2 * | 12/2004 | Bateman | 250/282 |
| 6,884,995 | B2 * | 4/2005 | Bateman et al. | 250/281 |
| 2001/0038069 | A1 * | 11/2001 | Whitehouse et al. | 250/288 |
| 2001/0054685 | A1 * | 12/2001 | Franzen | 250/287 |
| 2002/0070338 | A1 * | 6/2002 | Loboda | 250/287 |
| 2002/0125421 | A1 | 9/2002 | Yoshinarl et al. | |
| 2003/0136905 | A1 * | 7/2003 | Franzen et al. | 250/292 |
| 2004/0132083 | A1 * | 7/2004 | Kawato et al. | 435/6 |
| 2004/0195503 | A1 * | 10/2004 | Kim et al. | 250/288 |
| 2005/0118724 | A1 * | 6/2005 | Bateman et al. | 436/173 |

FOREIGN PATENT DOCUMENTS

WO WO 00/33350 6/2000

* cited by examiner

*Primary Examiner*—Jack I. Berman
*Assistant Examiner*—Michael Maskell
(74) *Attorney, Agent, or Firm*—Torys LLP

(57) ABSTRACT

An ion guide 24 for a mass spectrometer 30 including means for ejecting ions of different mass-to-charge ratios from the ion guide towards a detector or other object or device. The ejecting means causes the ions to be ejected in a desired sequence. The ions travel at different rates according to their mass-to-charge ratios, so that they arrive at a desired point in space in a desired sequence, for example in a detector 56 of a mass spectrometer at substantially the same time.

26 Claims, 10 Drawing Sheets

ION GUIDE FOR MASS SPECTROMETER

RELATED APPLICATION

This application claims the benefit of U.S. provisional patent application Ser. No. 60/567,817 filed May 5, 2004, and entitled Time of Flight Mass Spectrometer, the entire contents of which are hereby incorporated by reference.

BACKGROUND OF THE INVENTION

The invention relates generally to mass spectrometry, and more particularly to ion guides for use with mass spectrometers.

Many types of mass spectrometers are known, and are widely used for trace analysis and for determining the structure of ions. These spectrometers usually separate ions based on their mass-to-charge ratio ("m/z"). Some of these spectrometers include quadrupole mass analyzers, in which RF/DC ion guides are used for transmitting ions within a narrow range of m/z values; magnetic sector analyzers, in which large magnetic fields exert forces perpendicular to the direction of motion of moving ions, in order to deflect the ions according to their m/z; and time-of-flight ("TOF") analyzers, in which measurement of flight time over a known path for an ion allows the determination of its mass-to-charge ratio.

Unlike quadrupole mass-analyzers, TOF analyzers can record complete mass spectra without the need for scanning parameters of a mass filter, thus providing a higher duty cycle and resulting in better use of the sample. In certain mass spectrometers, RF ion guides are coupled with orthogonal TOF mass analyzers, where the ion guide is for the purpose of transmitting ions to the TOF analyzer, or are used as collision cells for producing product ions and for delivering the product ions (in addition to any remaining precursor ions) to the TOF analyzer. Combining an ion guide with the orthogonal TOF is a convenient way of delivering ions to the TOF analyzer for analysis.

It is presently known to employ at least two modes of operation of orthogonal TOF mass spectrometers employing ion guides.

In the first mode, a continuous stream of ions leaves a radio-frequency-only quadrupole ion guide and is directed to an extraction region of the TOF analyzer. The stream is then sampled by TOF extraction pulses for detection in the normal TOF manner. This mode of operation has duty cycle losses as described, for example, in a tutorial paper by Chernushevich et al., in the Journal of Mass Spectrometry, v. 36, pp. 849-865, 2001 ("Chernushevich et al.").

The second mode of operation is described in Chernushevich et al., as well as in U.S. Pat. No. 5,689,111 and in U.S. Pat. No. 6,285,027. This mode involves pulsing ions out of a two-dimensional ion guide such that ions having particular m/z values (i.e., m/z values within narrowly-defined ranges) are bunched together in the extraction region of the TOF. This mode of operation reduces transmission losses between the ion guide and the TOF, but due to the dependence of ion velocity on the m/z ratio only ions from a small m/z range can be properly synchronized, leading to a narrow range of m/z (typical $(m/z)_{max}/(m/z)_{min}$~2) that can be effectively detected by the TOF analyzer. Thus, when ions with a broad range of masses have to be recorded, it is necessary to transmit multiple pulses having parameters specific to overlapping m/z ranges in order to record a full spectrum. This results in inefficiencies since ions outside the transmission window are either suppressed or lost. One way to avoid this loss is proposed in commonly-assigned U.S. Pat. No. 6,744,043. In this patent, an ion mobility stage is employed upstream of the TOF analyzer. The mobility migration time of the ions is somewhat correlated with the m/z values of the ions. This allows for adjustment of TOF window in pulsed mode so that the TOF window is always tuned for the m/z of ions that elute from the ion mobility stage. However, addition of the mobility stage to the spectrometer apparatus increases the complexity and cost of the apparatus. Moreover, the use of pulsed ejection and corresponding continual adjustment of the TOF window prevents optimal efficiencies in cycle time, or process turnaround, for the spectrometer.

SUMMARY OF THE INVENTION

The invention provides apparatus and methods for novel ion guides and mass spectrometers incorporating such guides which, among other advantages, obviate or mitigate the above-identified disadvantages of the prior art.

The invention provides apparatus and methods that allow, for example, analysis of ions over broad m/z ranges with virtually no transmission losses. The ejection of ions from an ion guide is effected by creating conditions where all ions (regardless of m/z) may be made to arrive at a designated point in space, such as for example an extraction region of a TOF mass analyzer, in a desired sequence or at a desired time and with roughly the same energy. Ions bunched in such a way can then be manipulated as a group, as for example by being extracted using a TOF extraction pulse and propelled along a desired path in order to arrive at the same spot on a TOF detector at the same time.

To make heavier and lighter ions with the same energy meet at a point in space such as the extraction region of a mass analyzer at substantially the same time, heavier ions can be ejected from the ion guide before lighter ions. Heavier ions of a given charge travel more slowly in an electromagnetic field than lighter ions of the same charge, and therefore can be made to arrive at the extraction region or other point at the same time as, or at a selected interval with respect to, the lighter ions if released within a field in a desired sequence. The invention provides mass-correlated ejection of ions from the ion guide in a desired sequence.

In one aspect, the invention provides an ion guide for a mass spectrometer. The ion guide defines a guide axis and is adapted to generate an ion control field useful for restraining ions within the guide from movement in directions normal to the guide axis, and for controlling movement of ions parallel the guide axis. For example, the field is useful for causing ions to be distributed along the axis of the guide according to their m/z values. Thus, for example, the field can be adapted to provide for the selective release of ions having varying mass-to-charge ratios from the guide according to a desired sequence along paths parallel to the guide axis. The sequence can be configured, for example, to provide for the arrival of ions of any or all of a set of desired mass-to-charge ratios at a selected extraction region within, for example, a TOF mass analyzer, the region being disposed along the guide axis, in a desired sequence, such as for example at substantially the same time. The field can be adapted, for example, to provide for the release of ions of relatively higher mass-to-charge ratios prior to the release of ions of relatively lower mass-to-charge ratios, so that ions of relatively higher mass-to-charge ratios which are traveling more slowly in an electromagnetic field than ions of relatively lower mass-to-charge ratios can be delivered to a desired point along the axis of the ion guide at substantially the same time, or in a desired sequence.

Ion control fields according to the invention may be produced in any manner suitable for accomplishing the purposes disclosed herein, including, for example, by means of manipulation of electrical currents and/or magnetic fields, and/or by the use of gas pressures. For example, ion guides according to the invention can comprise pluralities of electrodes, the ion control fields of such embodiments comprising electromagnetic fields produced by applying electrical voltages to the electrodes. Such voltages can include any suitable combinations of alternating and/or direct current voltages, including, for example, voltages alternating at frequencies ("RF" frequencies) commonly associated with radio transmissions. Alternatively ion guides according to the invention can be adapted to provide and manipulate relatively low-pressure and relatively high-pressure regions, and to control the movement of ions through the use of pressure gradients.

The invention further provides mass spectrometers and other devices comprising such ion guides, and methods of employing such guides in the manipulation of ions, as for example for use in analyzing the masses or m/z ratios of ions.

For example, the invention provides methods of guiding ions differing in mass-to-charge ratios, such methods comprising providing an ion guide defining a guide axis an ion control field, the ion control field comprising a component for restraining movement of ions in directions normal to the guide axis; and manipulating the ion control field to control the movement of ions along the guide axis. For example, the ion control field can be adapted to provide one or more accumulation potential profiles for use in, for example, accumulating ions within a constrained space within the ion guide; one or more pre-ejection profiles useful for, for example, preventing ions from accumulating in the ion guide; and/or one or more ejection potential profiles useful for, for example, sequentially ejecting ions of varying mass-to-charge ratios from the guide according to the mass-to-charge ratios of the ions and along a path parallel to the guide axis, such that, for example, all of the ejected ions arrive at an extraction region disposed substantially along the guide axis in a desired sequence, as for example at substantially the same time.

Specific examples of apparatus according to the invention include mass spectrometers employing ion guides and time-of-flight mass analyzers, the ion guides including elements for ejecting ions of different masses at different times such that the ions, traveling at different rates based on their different masses, arrive at the analyzer at substantially the same time.

Examples of methods according to the invention further include detecting ions of different masses by, for example, (a) accumulating the ions in an ion guide using an accumulation potential profile; (b) ejecting the ions from the ion guide using an ejection potential profile such that ions of different masses are ejected at different times; and, (c) receiving the ions at a point downstream of the ion guide at substantially the same time for detection. Methods according to the invention can comprise additional steps including, for example, preventing further ions from accumulating in the ion guide using a pre-ejection potential profile.

Additional aspects of the present invention will be apparent in view of the description which follows.

BRIEF DESCRIPTION OF THE FIGURES

The invention is illustrated in the figures of the accompanying drawings, which are meant to be exemplary and not limiting, and in which like references are intended to refer to like or corresponding parts.

DETAILED DESCRIPTION OF THE PREFERRED EMBODIMENTS

Figure 1:
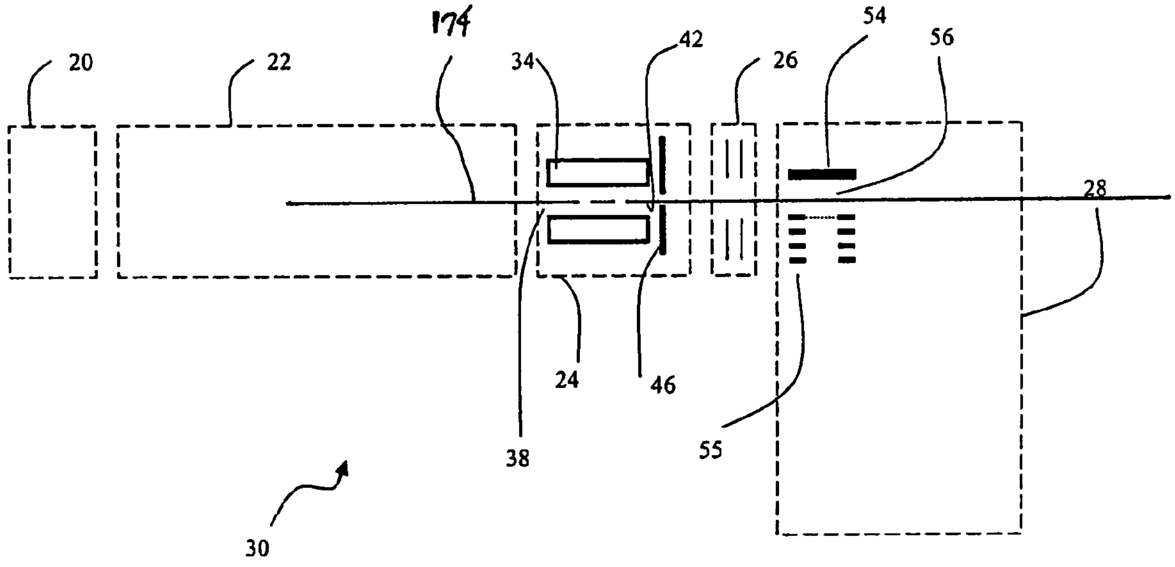
FIGS. 1 and 2 are schematic representations of apparatus in accordance with the invention.

Referring now to FIG. 1, an apparatus according to the invention is indicated generally at 30. In the embodiment shown in FIG. 1, apparatus 30 comprises a mass spectrometer including ion source 20, ion guide 24, and mass analyzer 28.

Ion source 20 can include any type of source compatible with the purposes described herein, including for example sources which provide ions through electrospray ionization (ESI), matrix-assisted laser desorption ionization (MALDI), ion bombardment, application of electrostatic fields (e.g., field ionization and field desoprtion), chemical inonization, etc. The selection of suitable ion sources can depend, for example, on the type of sample to be analyzed. The selection of suitable ion sources and their incorporation into apparatus according to the invention will not trouble those of ordinary skill in the art, once they have been made familiar with this disclosure.

Ions from ion source 20 may be passed into an ion manipulation region 22, where ions can be subjected to ion beam focusing, ion selection, ion ejection, ion fragmentation, ion trapping (as shown for example in U.S. Pat. No. 6,177,668), or any other generally known forms of ion analysis, ion chemistry reaction, ion trapping or ion transmission. Ions so manipulated can exit the manipulation region 22 and pass into an ion guide indicated by 24.

Ion guide 24 defines axis 174 and comprises inlet 38, exit 42 and exit aperture 46. Ion guide 24 is adapted to generate or otherwise provide an ion control field comprising a component for restraining movement of ions in directions normal to the guide axis and a component for controlling movement of ions parallel to the guide axis. For example, an RF voltage is applied to ion guide 24 in known manner, for providing ion confinement in the radial direction, while in order to control movement of ions along the guide axis various potential profiles are superimposed in the ion guide using voltages and/or other potential fields as described herein.

Figure 2:
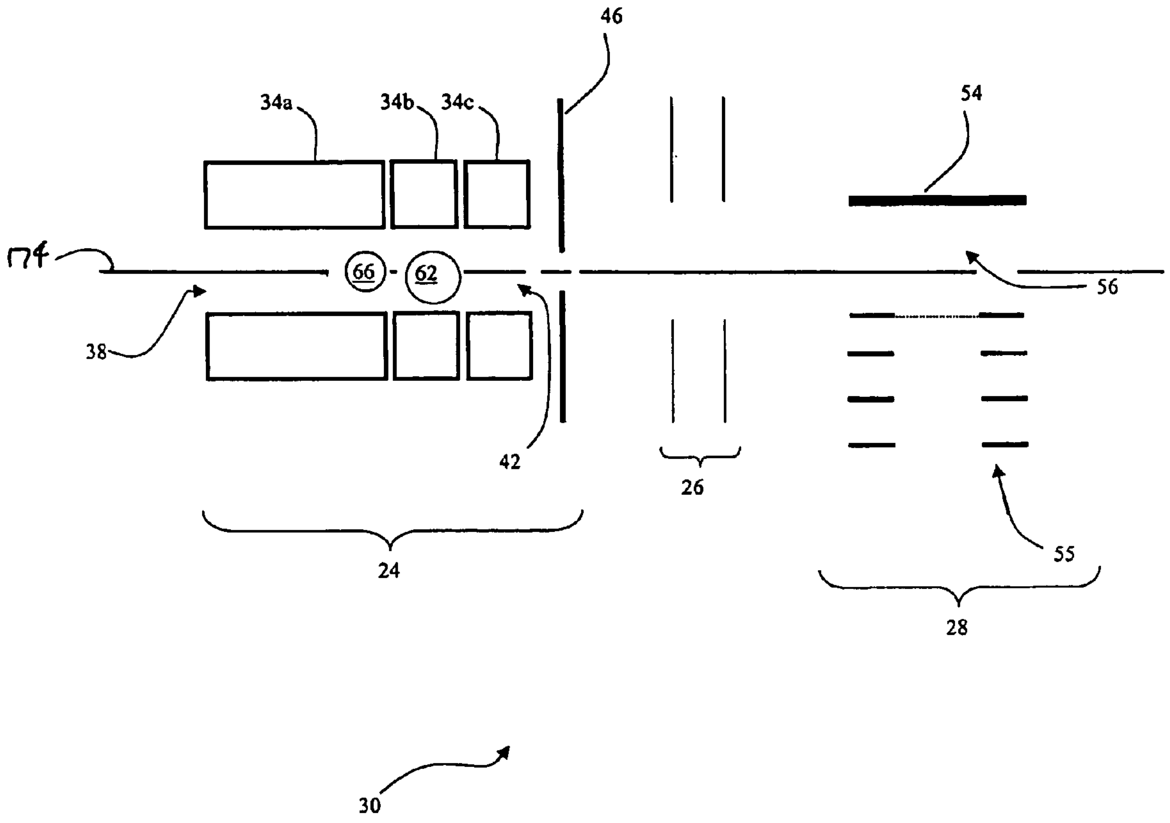
Figure 8:
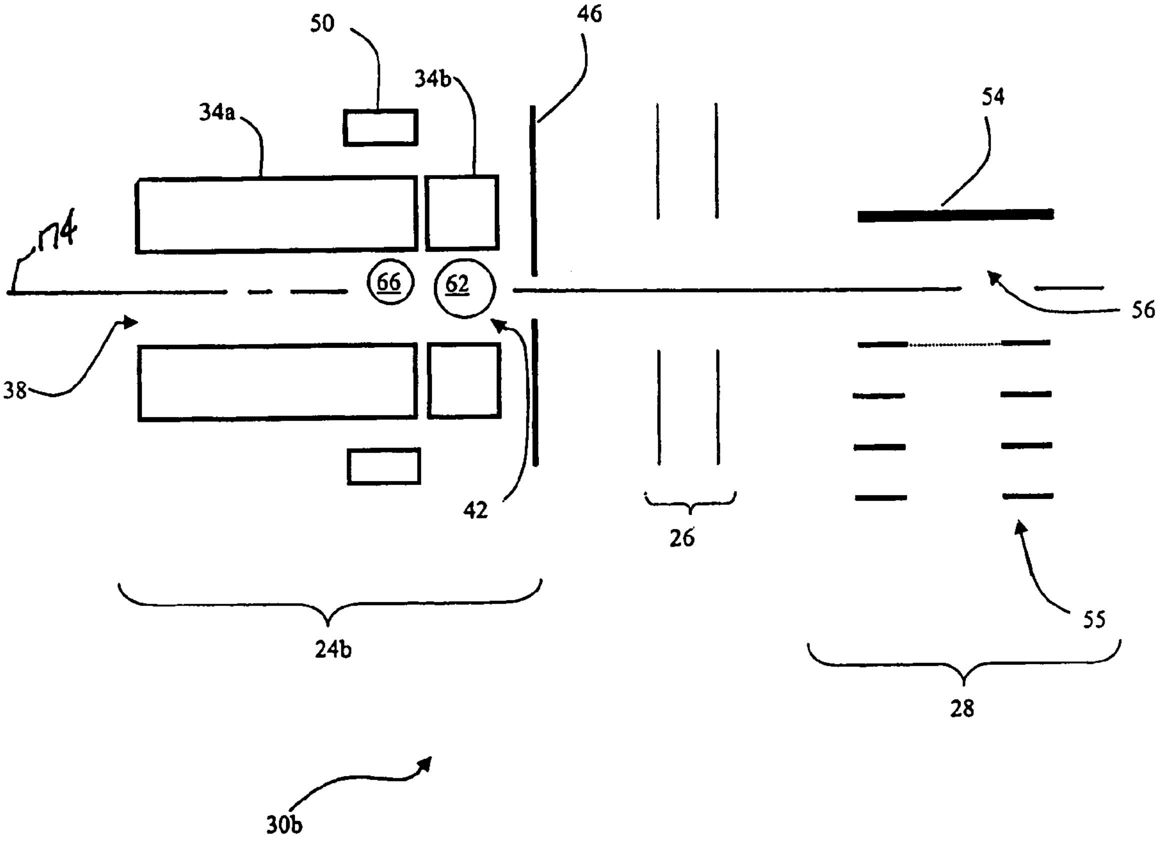

Ion guide 24 may include multiple sections or portions 34*a*, 34*b* & 34*c* as shown in FIG. 2 and/or auxiliary electrodes 50 as shown in FIG. 8. As will be explained in greater detail below, ion guide 24 of spectrometer 30 is operable to eject ions of different masses and/or m-z ratios from exit 42, while maintaining radial confinement along axis 174 within and beyond the ion guide 24, such that the ions arrive at a desired point substantially along the axis of the ion guide, or in a desired proximity thereto, such as within extraction region 56 of mass analyzer 28, adjacent to push plate 54, at substantially the same time, or in a desired sequence.

Ions ejected from ion guide 24 can be focused or otherwise processed by further apparatus, as for example electrostatic lens 26 (which may be considered a part of guide 24) and/or mass analyzer 28. Spectrometer 30 can also include devices such as push plate 54 and accelerating column 55, which may for example be part of an extraction mechanism of mass analyzer 28.

Figure 3:
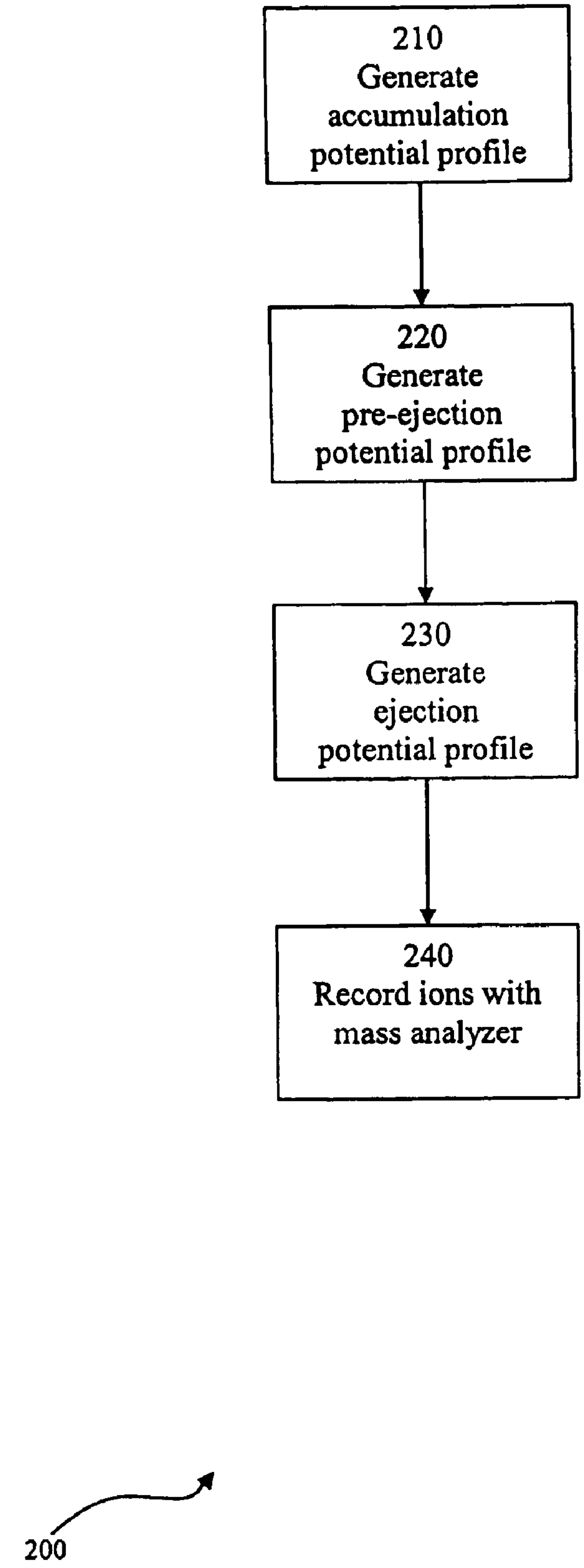
FIG. 3 is a flow diagram illustrating a method for detecting or otherwise analyzing ions of different masses utilizing apparatus according to the invention.

To help understand spectrometer 30, FIG. 3 illustrates a method 200 for ion ejection and detection in accordance with the invention. In order to assist in explanation of the method, it will be assumed that method 200 is operated using a spectrometer such as apparatus 30 of FIG. 1. However, it is to be understood that apparatus 30 and/or method 200 can be varied, and need not work exactly as discussed herein in conjunction with each other, and that such variations are within the scope of the present invention.

Figure 4:
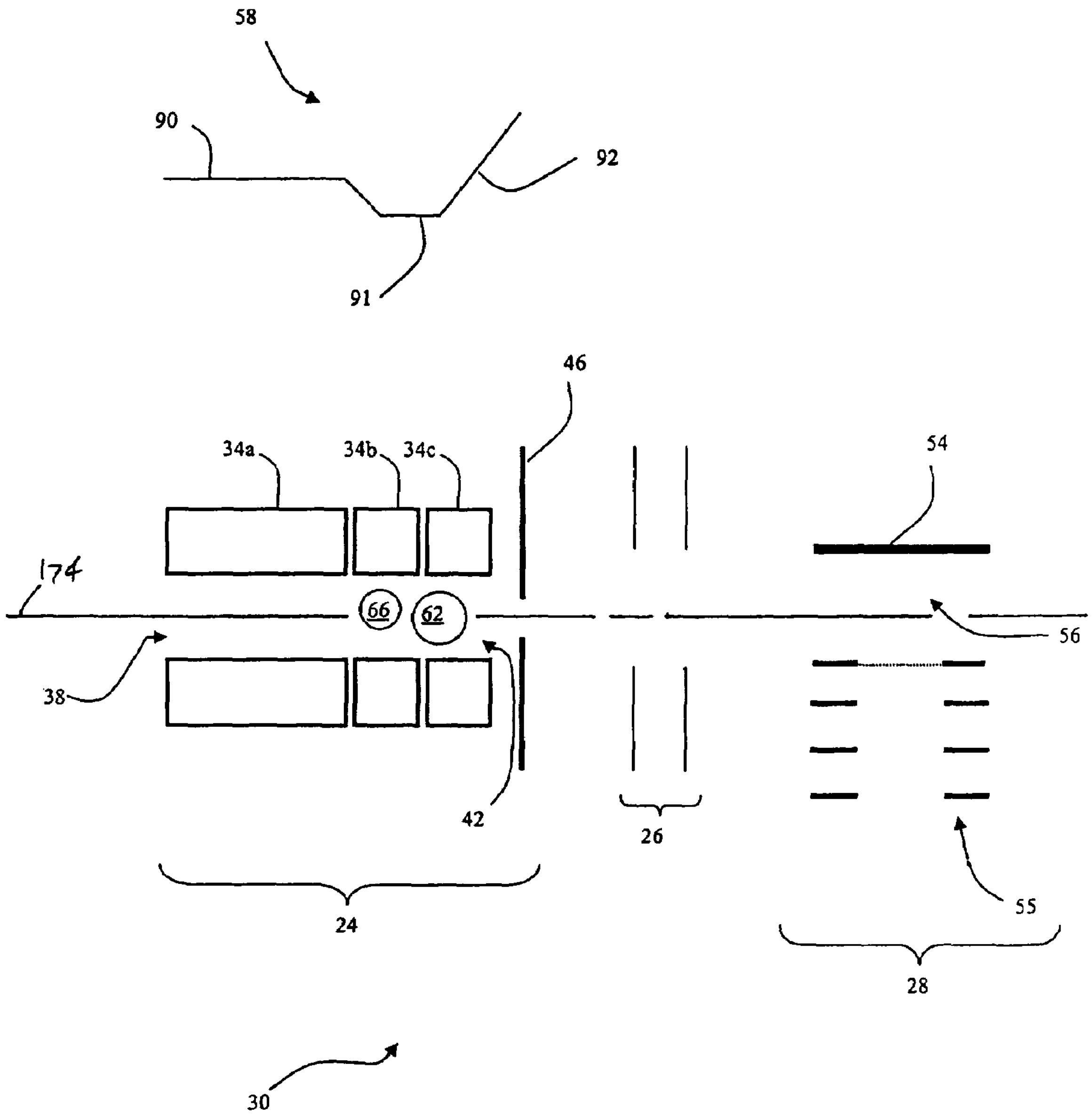
FIGS. 4-6 are schematic representations of apparatus according to the invention, further illustrating voltage potentials that may be provided along axes of ion guides according to the invention.

At 210 in FIG. 3 an accumulation potential profile is provided within ion guide 24. A representative accumulation profile is shown in FIG. 4. Accumulation potential profile 58 of FIG. 4 represents relative potential values, such as voltages or pressures, provided along axis 174 of ion guide 24. The relative potential at portion 34*a* of ion guide 24 is indicated at 90, the potential provided at portions 34*b* and 34*c* at 91, and the potential gradient provided across portion 34*c* of the ion guide and exit 42 aperture 46 at 92. Although not shown, an RF voltage is applied to ion guide 24 for providing confinement of the ions in the radial direction. Thus an ion control field comprising a component for restraining movement of ions in directions normal to the guide axis and a component for controlling movement of ions parallel to the guide axis is provided in ion guide 24.

For example, ion guide 24 may comprise one or more electrodes, and the ion control field may be provided by applying electrical voltage across the electrodes to generate an electromagnetic field within the ion guide. In the example shown in FIG. 4, portions 34*a*, 34*b*, and 34*c* of ion guide 24 may comprise separate electrodes, with applied voltages generating for example a suitable RF field at a frequency of between about 100 kHz and 30 MHz, and preferably, for most mass spectrometry applications, about 2.5-3.6 MHz in order to restrain movement of ions in directions normal to the guide axis. DC voltage of between about −0.1 and −100 Volts, and preferably between about −1 to −5 Volts can be applied to electrodes 34*b* and 34*c* to establish potential 91 while the voltage at the outer end of gradient 92 on aperture 46 may be set at between about 0.1 and 1000 Volts, preferably, between about 1 and 10 Volts. Electrodes 34*a, b, c* of ion guide may comprise, for example, opposing pairs of quadrupole, hexapole, or other electrode sets.

Provision of an accumulation potential 58 such as that shown in FIG. 4 within ion guide 24 allows large ions 62 (i.e., ions having large m/z values) and small ions 66 (i.e., ions having small m/z values) to traverse ion guide 24 in a direction parallel to axis 174 and settle into the preferential region proximate to electrodes 34*b* and 34*c* provided by the low potential at 91, but prevents them from exiting the ion guide 24 by providing a higher potential on the aperture 46. As will be familiar to those skilled in the relevant arts, it may be beneficial in some circumstances to apply a DC offset voltage on ion guide 24 in addition to the DC voltage mentioned above. In that instance, the overall potential profile 58 would be elevated by the corresponding DC offset voltage.

Figure 5:
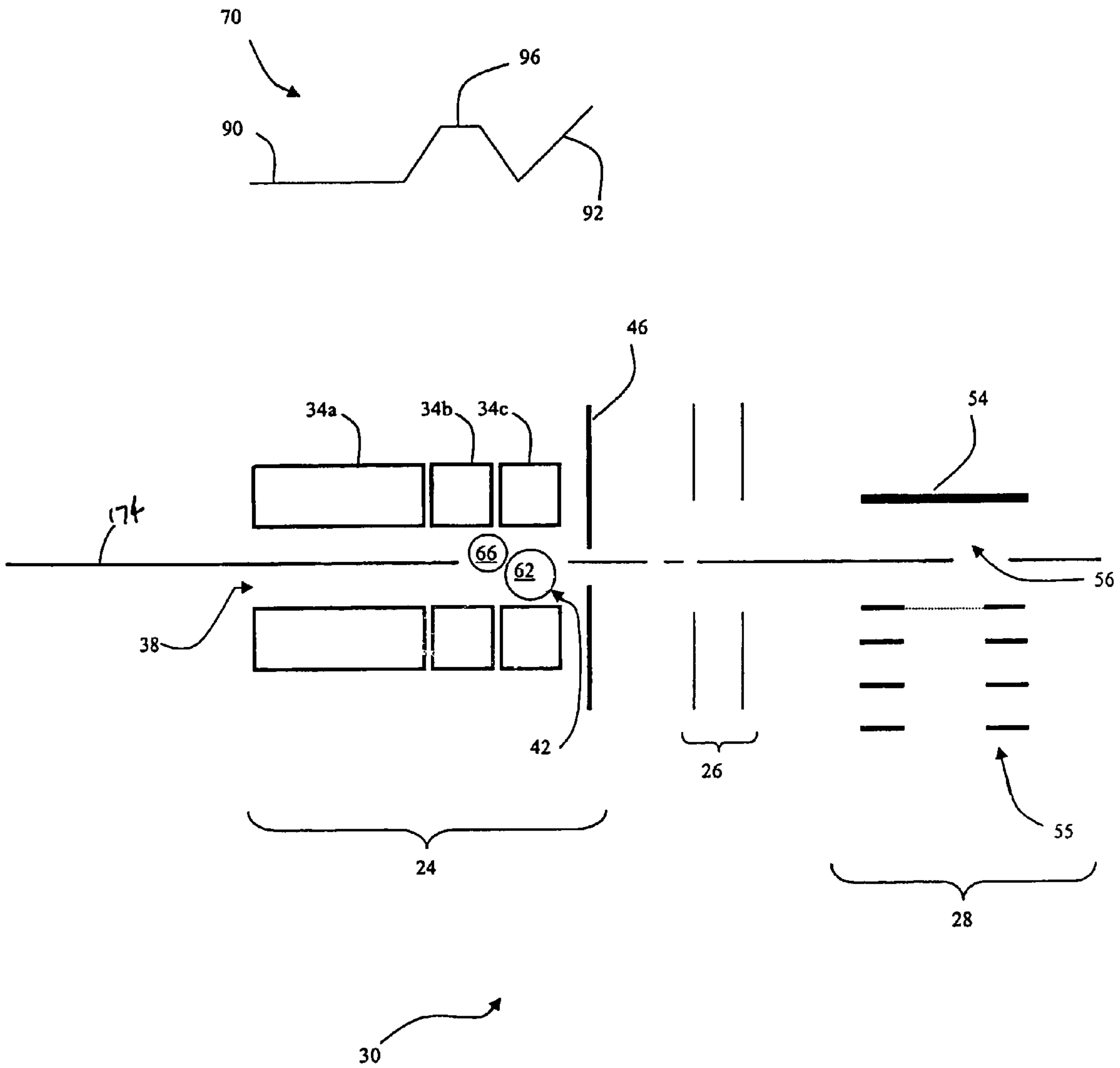

At 220 in FIG. 3 a pre-ejection potential profile is provided within ion guide 24. A representative pre-ejection profile is shown in FIG. 5. Pre-ejection potential profile 70 of FIG. 5 represents relative potential values, such as voltages or pressures, provided along axis 174 of ion guide 24. In the example shown in FIG. 5, pre-ejection profile 70 is similar to that described for accumulation potential profile 58, but with potential 91 replaced by potential 96 at portion 34*b* of the ion guide and corresponding changes in potential gradient 92.

Thus a modified ion control field comprising a component for restraining movement of ions in directions normal to the guide axis and a component for controlling movement of ions parallel to the guide axis is provided in ion guide 24.

For example, in an embodiment such as that described with respect to FIG. 4 in which an ion control field is provided by passing electrical current through the electrodes to generate electromagnetic field(s) within the ion guide, an RF voltage can be maintained on ion guide 24 to ensure radial confinement of the ions, while a DC voltage in portion 34*b* of the ion guide may be raised, for example to between about 0.5 and 50 Volts, or more particularly between about 1 and 5 Volts; the voltage in portion 34*c* can be set at a lower potential, as for example 0 Volts; and a voltage on aperture 46 maintained at a higher potential, as for example between 1 to 10 volts.

Provision of a pre-ejection profile 70 such as that shown in FIG. 5 can for example be used to cause ions 62 of relatively larger m/z and ions 66 of relatively smaller m/z to move within ion guide 24 in a direction parallel to axis 174 and settle within the region of ion guide 24 between portion 34*b* of the guide and aperture 46. The potential at 96 can also prevent additional ions from entering ion guide 24 to a point beyond portion 34*b*. While not essential, at this point a delay may be advantageously implemented to help reduce ion energy distribution via collisions with buffer gas molecules.

Figure 6:
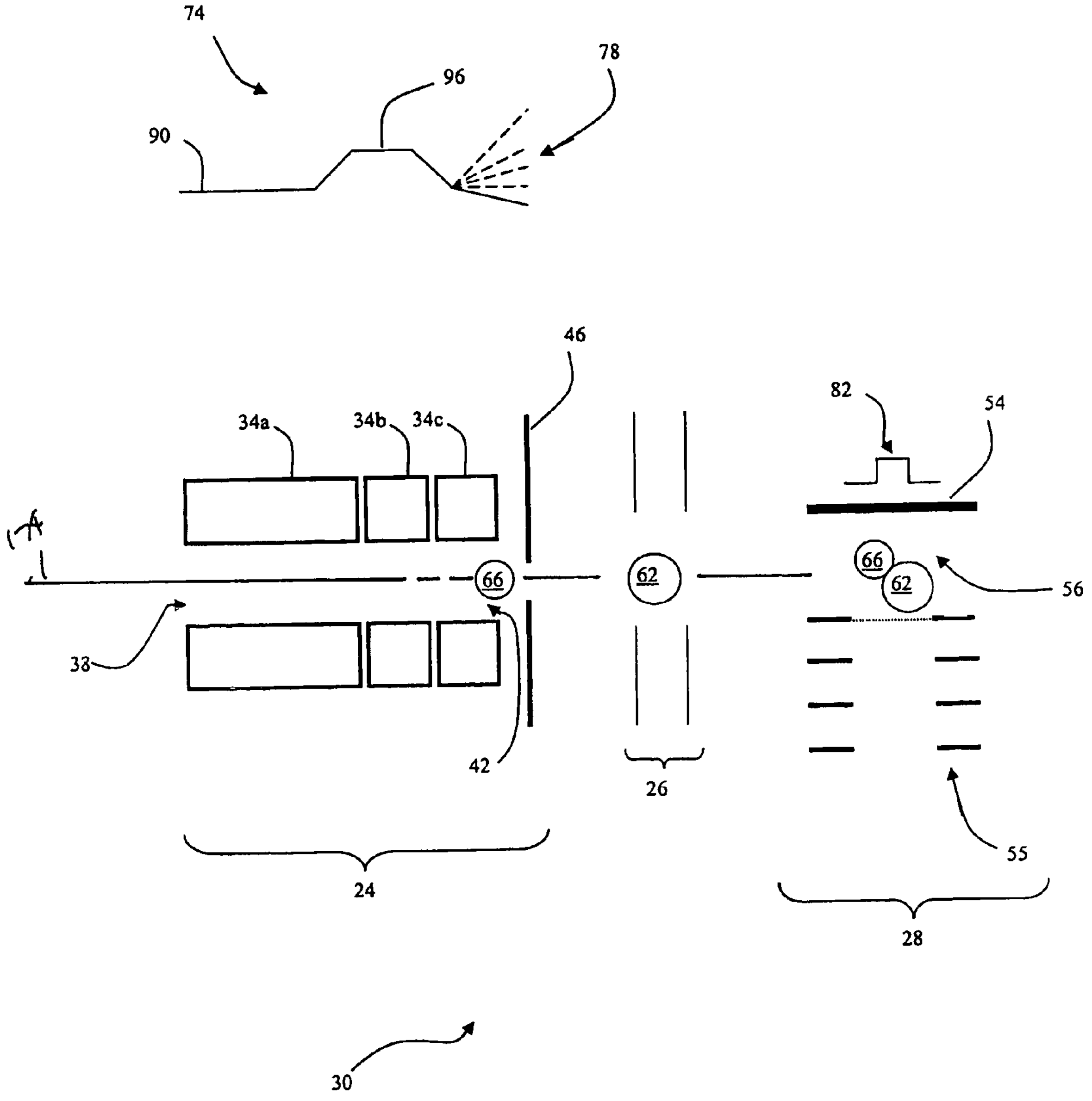

At 230 an ejection potential profile is provided within ion guide 24. A representative ejection potential profile is shown in FIG. 6. Ejection potential profile 74 of FIG. 6 can be created by, for example, applying an alternating current ("AC") voltage within portion 34*c* of ion guide 24 and/or at an exit aperture 46, superimposed on voltages otherwise applied to the ion guide 24. For example, appropriate RF and DC potentials may be applied to opposed pairs of electrodes within an ion guide 24, along with suitable DC offset voltages applied to various sets of electrodes, as described above and in commonly-owned U.S. Pat. No. 6,111,250. The AC voltage can for example be superimposed over the RF voltage, while a difference between a potential at portion 34*c* and a potential at exit aperture 46 is reduced.

Ejection potential profile 74 along the axis of guide 24 can be provided by, for example, using a pseudopotential such as that represented by dashed lines at reference 78 in FIG. 6. Background information about pseudopotentials can be found in Gerlich, Rf Ion Guides, in "The Encyclopaedia of Mass Spectrometry", Vol 1, 182-194 (2003), the contents of which are incorporated herein by reference. The magnitude or depth of pseudopotential 78 can advantageously be determined in accordance with expected masses and/or charges of ions 62 and 66, and can advantageously be set greater for control of ions having lower m/z ratios.

The relative magnitudes of the various potentials provided in accumulation potential profiles, pre-ejection potential profiles, and ejection profiles according to the invention can be determined and set at various levels, static and dynamic, in order to achieve desired purposes in manipulating the ions, as for example to provide for release of ions from the ion guide 24 in accordance with desired sequences. For example, such potentials may be selected, and suitable profiles implemented, in order to provide for release of ions having varying mass-to-charge ratios in desired sequences according to their mass-to-charge ratios. This can be particularly advantageous where, for example, it is desired to eject ions which will travel at varying speeds in such manner as to provide for their arrival at a desired point simultaneously, or in a desired sequence.

For example, at the beginning of an ejection cycle such as cycle 74 represented in FIG. 6, the magnitude or depth of a pseudopotential 78 may be chosen so that ions 62 of larger m/z ratios will leave exit 42 first. As the larger m/z ions 62 are released, the amplitude of the AC voltage may be gradually reduced to change the depth of the pseudopotential 78 well, and after a desired delay, to allow ions 66 of smaller m/z to leave ion guide 24. The delay may be determined by controlling the rate of change of the AC amplitude, and may for example be chosen based on the masses and/or m/z ratios of ions 62 and 66 to achieve a desired delay. In the situation shown in FIG. 6, ions 66 of smaller m/z travel faster than the ions 62 of larger m/z and gradient 78 is set accordingly.

At 240 in FIG. 3, ions are provided to a desired point in space 56 disposed on, or substantially along, guide axis 174, as for example an extraction region in a TOF analyzer for detection and mass analysis using methods generally known in the art. This is represented at the right hand portion of FIG. 6, where the different rates of travel of ions 62 and 66 have resulted in ions 62 and 66 reaching the orthogonal extraction region 56 in front of push plate 54, at substantially the same time. At this point, an extraction pulse 82 may be applied to push plate 54 to pulse ions 62, 66 through the accelerating column 55.

Figure 7:
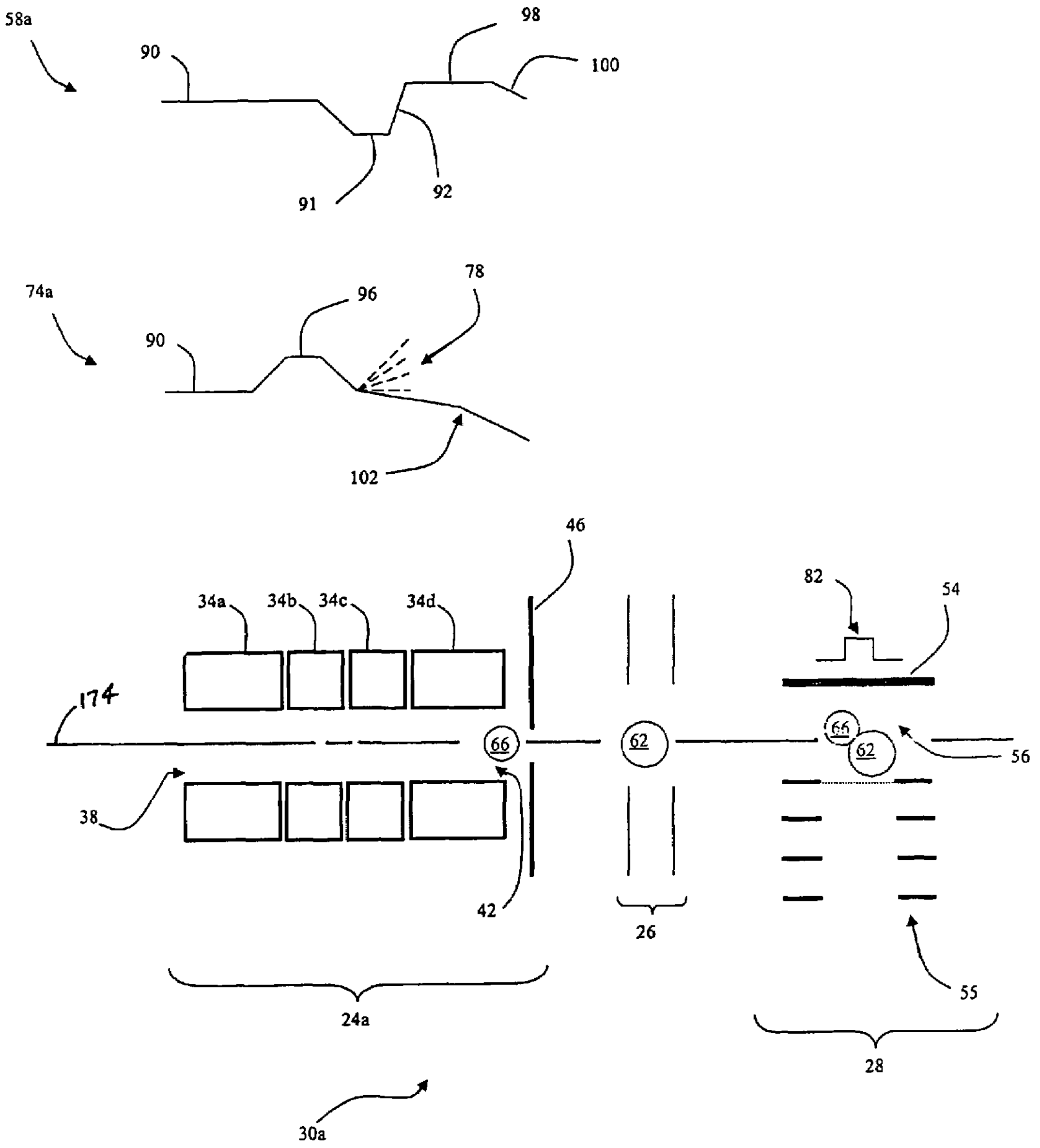
FIGS. 7-10 are schematic representations of apparatus in accordance with embodiments of the invention, illustrating voltages that may be provided along the axis of an ion guide during various stages of an exemplary operation.

As will be apparent to those of ordinary skill in the art, once they have been made familiar with this disclosure, different voltage profiles and different numbers and types of ion guide sections or portions 34*a,b,c*, and elements thereof can be employed to accomplish the purposes described herein. For example, referring now to FIG. 7, an alternative embodiment of an ion guide 24, comprising electrodes suitable for providing an electromagnetic accumulation potential profile is shown. Accumulation potential profile 58*a* generated by ion guide 24 can be used instead of or with accumulation potential profile 58 of FIG. 4. Spectrometer 30*a* of FIG. 7 is generally similar to spectrometer 30, and elements of spectrometer 30*a* that are like elements in spectrometer 30 bear the same reference characters. Similar to function of profile 58, ions 62, 66 are thus allowed to traverse ion guide 24 and settle into the preferential region defined by the low potential at 91, provided by ion guide portion 34*c*. The additional ion guide section indicated at 34*d*, and voltage applied to ion guide 34*d*, provide relatively higher potential 98 to prevent ions from exiting the ion guide 24. The potential difference between guide 34*d* and aperture 46, indicated at 100, allows any ions, which may have been present downstream of guide 34*d* during the accumulation setup, to escape.

Alternative ejection potential profiles such as profile 74*a*, also illustrated in FIG. 7, can be used instead of or with ejection potential profile 74. Profile 74*a* of FIG. 7 provided by ion guide 24*a* is similar to profile 74 with the addition of a potential gradient 102 established by the presence of the appropriate voltages applied to ion guide portion 34*d* and aperture 46. Ions 62, 66 released by the pseudopotential 78 are thus allowed to traverse the length of ion guide portion 34*d*, through exit 42, generally uninhibited. Potential gradient 102 can be selected so that the traversing ions 62, 66 do not experience an increase in energy as they exit through aperture 46.

Referring now to FIG. 8, a spectrometer in accordance with another embodiment of the invention is indicated generally at 30*b*. Spectrometer 30*b* is generally similar to spectrometer 30, and elements of spectrometer 30*b* that are like elements in spectrometer 30 bear like reference characters. Ion guide 24*b* of spectrometer 30*b* includes a set of auxiliary electrodes 50 having a function generally similar to those of electrodes 34*a,b,c,d* of ion guide 24. Electrodes 50 may be positioned external to the ion guide 24 and provided, for example, with a DC voltage in known manner to establish potential profile 96 of the pre-ejection and ejection potential profiles 74, 74*a* of FIGS. 6 and 7 respectively. The position of electrodes 50 along the axial length of ion guide 24 may be fixed, or they can be movable to vary the accumulation, ejection, and or pre-ejection profiles and the location and the number of the accumulated ions 62, 66 within ion guide 24*a* prior to, for example, generation of ejection potential profile 74. For example, it can be preferable in some circumstances to provide a pseudopotential 78 close to the accumulated grouping of ions while generating the ejection potential profile 74, so as to achieve a high level of ion ejection efficiency.

Figure 9:
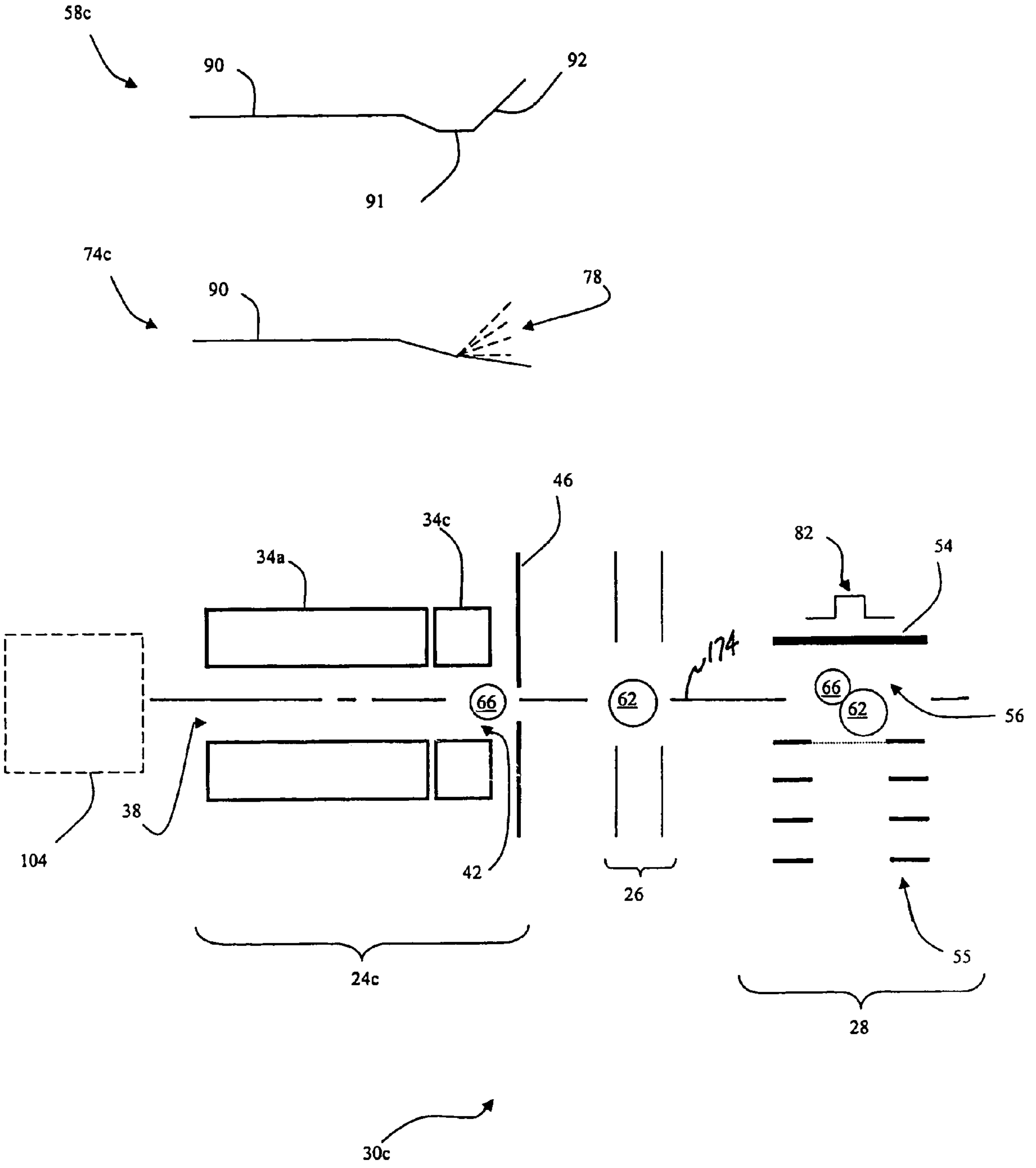

Referring now to FIG. 9, a spectrometer in accordance with another embodiment of the invention is indicated generally at 30*c*. Spectrometer 30*c* is generally similar to spectrometer 30, and elements of spectrometer 30*c* that are like elements in spectrometer 30 bear like reference characters. Spectrometer 30*c* can in some circumstances be particularly well suited for the release of ions according to a desired sequence employing a reduced number of potential profiles. For example, ion guide 24*c* of FIG. 9 may be adapted to employ only two potential profiles, an accumulation profile 58*c* and an ejection profile 74*c*. Accumulation profile 58*c* can function in a manner similar to that of profile 58 discussed above. In such a variation, when ejection profile 74*c* is employed, ions entering ion guide 24, 24*c* at inlet 38 are not prevented from traversing beyond ion guide section 34*c* while ions of interest are ejected. The incoming ions may be ejected without significant mass correlation and may be lost prior to reaching extraction region 56. To minimize the number of lost ions, an appropriate duty cycle can be selected whereby, for example, the ratio of the accumulation period is substantially longer than the ejection period. Alternatively, an ion trapping device, such as a linear quadrupole ion trap or a 3D ion trap indicated at 104, may be positioned upstream of ion guide 24, 24*c* to trap and pulse ions into the ion guide 24*c*. During a procedure such as ejection step 230 of FIG. 3, the upstream ion trap 104 can prevent ions from entering ion guide 24*c* while ions 62, 66 are ejected from ion guide 24*c* according to the ejection potential profile, While specific combinations of the various features and components of the invention have been discussed herein, it will be apparent to those of skill in the art, once they have been made familiar with this disclosure, that desired subsets of the disclosed features and components and/or alternative combinations of these features and components can be utilized, as desired, to achieve the purposes disclosed herein. For example, ion guide 24 and its variants 24*a, b*, and *c* can be of different configurations, comprising for example multipole ion guides (quadropole, hexapole, etc.), ring guides, and/or double helix ion guides. Ion guide sections 34*a*, 34*b*, 34*c* etc., may have identical or different dimensions and properties, each optimized with accordance to the applied voltages to achieve the most efficient or otherwise desired potential profiles. Additional electrodes and/or ion guide sections such as electrodes 50 may be positioned at locations within or without the ion guide, such as between adjacent rods of a multiple ion guide or between adjacent rings of an RF ion guide. The shape of the electrodes may be modified to facilate convenient or otherwise desirable placement within and around the ion guide, such as described in copending patent application U.S. Ser. No. 10/449,912 published as 20040011956, the contents of which are incorporated herein by reference.

The invention may be implemented using any means of controlling ion movement consistent with the purposes disclosed herein. For example, in addition to the use of electromagnetic fields within an ion guide 24, it is possible to implement the invention using ion guides adapted to provide one or more relatively low-pressure regions and one or more relatively high-pressure regions in a gas, to employ pressure gradients as a part of the ion control field. For example, one or more flows of buffer gas may be used to motivate ions to move toward desired portions of the ion guide, and/or to cause such ions to exit the ion guide when desired. Pulses of buffer gas may also be used to temporarily raise the pressure within the ion guide in order to speed up collisional velocity relaxation among trapped ions.

Figure 10:
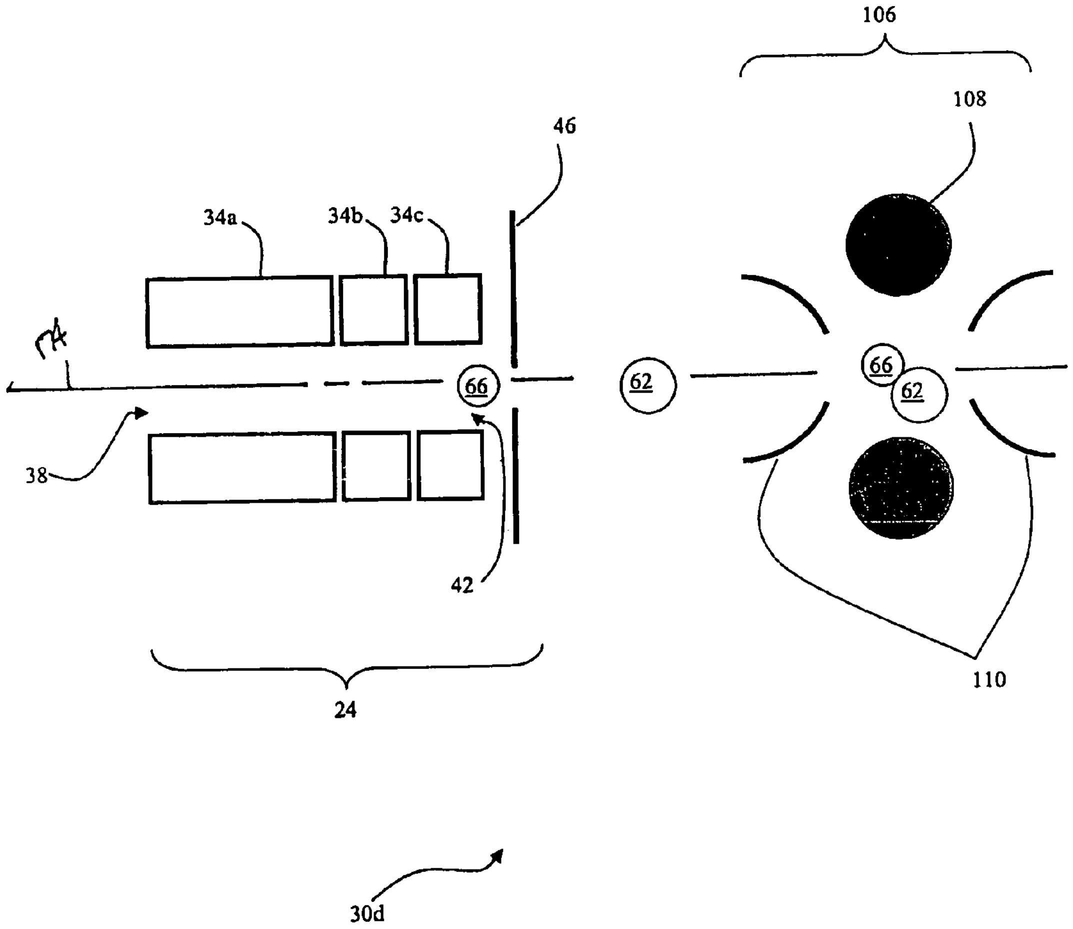

Furthermore, mass spectrometer 30, 30*a*, 30*b*, 30*c* need not be limited to use with TOF mass analyzers. Any type or combination of types of mass spectrometers consistent with the purposes disclosed herein will serve. For example, referring to FIG. 10, spectrometer 30*d* comprises 3D ion trap 106 of a type having ring electrodes 108 and endcap electrodes 110. In typical operation, the voltages on trap 106 are adjusted to allow ions to fill its trapping volume for a specific period of time. During that time, it may for example be advantageous to inject heavier and lighter ions with the same energy at substantially the same time in order to trap a broad range of ions. The trap 106 may then subject the ions to mass analysis or it may function in known manner to deliver the ions to a further downstream mass analysis step.

Many other variations and modifications will be evident to those skilled in the relevant arts, once they have been made familiar with this disclosure. For example, except to the extent necessary or inherent, no particular order to steps or stages of methods or processes described in this disclosure is intended or implied. In many cases the order of process steps may be varied without changing the purpose, effect, or import of the methods described. The embodiments of the invention described herein, apparatus, method, and otherwise, are intended to serve as examples of the present invention, and alterations and modifications may be effected thereto without departing from the scope of the invention, which is defined solely by the claims appended hereto.

What is claimed is:

1. A mass spectrometer comprising an ion guide and a mass analyzer, the ion guide defining a guide axis and adapted to provide an ion control field comprising a component for restraining movement of ions normal to the guide axis and comprising a component for controlling movement of the ions parallel the guide axis;

the field having a controllable potential profile along the guide axis of the guide, the profile being adapted to provide for sequential release of the ions from the guide according to the mass-to-charge ratios of the ions and along a path parallel to the guide axis, wherein the same ion energy is applied to the ions over their travel through the ion guide to an extraction region disposed substantially along the guide axis irrespective of mass-to-charge ratio of the ions, and the ions are sequentially released with the same ion energy from the ion guide to provide for arrival of ions of substantially all released mass-to-charge ratios within the extraction region at substantially the same time.

2. The mass spectrometer of claim 1, wherein the potential profile includes a pseudopotential having a depth that is adapted to provide for the release of the ions.

3. The mass spectrometer of claim 1, wherein the mass analyzer comprises an orthogonal time-of-flight mass analyzer.

4. The mass spectrometer of claim 2, wherein the ion guide comprises a plurality of electrodes, and the ion control field comprises an electromagnetic field produced by applying one or more voltages to the electrodes.

5. The mass spectrometer of claim 4, wherein the depth of the pseudopotential is created by the one or more voltages, and the one or more voltages comprise at least one alternating current voltage and at least one direct current voltage.

6. The mass spectrometer of claim 5, wherein the at least one alternating current voltage comprises a radio-frequency alternating current voltage.

7. The mass spectrometer of claim 1, wherein the ion guide is adapted to provide at least one relatively low-pressure region and at least one relatively high-pressure region in a gas, and the ion control field comprises pressure gradients.

8. A method of guiding ions differing in mass-to-charge ratios, comprising:

providing in an ion guide defining a guide axis an ion control field comprising a component for restraining movement of ions normal to the guide axis;

providing in the ion control field an accumulation potential profile for accumulating the ions within a constrained space within the ion guide;

providing in the ion control field an ejection potential profile along the guide axis of the ion guide, the profile being adapted to apply the same ion energy to the ions over their travel through the ion guide to an extraction region disposed substantially along the guide axis irrespective of mass-to-charge ratio of the ions, and for sequential release of the ions with the same ion energy from the ion guide to provide for arrival of the ions of substantially all released mass-to-charge ratios within the extraction region at substantially the same time.

9. The method of claim 8 comprising providing in the ion control field a pre-ejection profile for preventing ions from accumulating in the ion guide.

10. The method of claim 8, wherein the extraction region is an extraction region of a mass analyzer and the method comprises simultaneously analysing ions of varying mass-to-charge ratios.

11. An ion guide for a mass spectrometer, the ion guide defining a guide axis and adapted to generate at least one ion control field for restraining movement of ions normal to the guide axis and for controlling movement of the ions parallel the guide axis;

the field having a controllable potential profile along the axis of the guide, the profile being adapted to cause the ions to be distributed along the guide axis of the guide according to a desired sequence of mass-to-charge ratios of the ions, and to provide for selective release of the ions having varying mass-to-charge ratios from the guide according to the desired sequence of mass-to-charge ratios along a path parallel to the guide axis, wherein the same ion energy is applied to the ions over their travel through the ion guide to an extraction region disposed substantially along the guide axis irrespective of mass-to-charge ratio of the ions, and the ions are sequentially released with the same ion energy from the ion guide to provide for arrival of ions of substantially all released mass-to-charge ratios within the extraction region at substantially the same time.

12. The ion guide of claim 11, wherein the potential profile includes a pseudopotential having a depth that is adapted to provide for the release of the ions.

13. The ion guide of claim 12 comprising a plurality of electrodes, wherein the ion control field comprises an electromagnetic field produced by applying electrical voltages to the electrodes.

14. The ion guide of claim 13, wherein the depth of the pseudopotential is controlled by the voltages, and the voltages comprise alternating current and direct current voltages.

15. The ion guide of claim 14, wherein the alternating current voltage comprises radio-frequency alternating current voltage.

16. The ion guide of claim 11, wherein the ion guide is adapted to provide at least one relatively low-pressure region and at least one relatively high-pressure region in a gas, and the ion control field comprises pressure gradients.

17. The mass spectrometer of claim 7, wherein the potential profile is adjusted at an exit end of the ion guide by lowering the pseudopotential depth.

18. The method of claim 8, wherein the ejection potential profile includes a pseudopotential having a depth, and the sequential ejection of the ions is performed by reducing the depth of the pseudopotential.

19. The ion guide of claim 16, wherein the potential profile is adjusted at an exit end of the ion guide by lowering the pseudopotential depth.

20. A method of guiding ions in a mass spectrometer with an ion control field, comprising:

adapting the ion control field with an accumulation potential profile for accumulating ions in the ion guide;

adapting the ion control field with a pre-ejection potential profile to prevent additional ions from accumulating in the ion guide;

adapting the ion control field with a pseudopotential along an axis of the ion guide to apply the same ion energy to the ions over their travel through the ion guide to an extraction region disposed substantially along the guide axis irrespective of mass-to-charge ratio, and to sequentially release the ions with the same ion energy from the ion guide; and receiving the released ions at the extraction region at substantially the same time for further processing.

21. The mass spectrometer of claim 1, wherein the controllable potential profile causes the ions to be distributed along the guide axis of the ion guide according to an order of highest to lowest mass-to-charge ratio.

22. The mass spectrometer of claim 9, wherein the pre-ejection profile causes the ions to be distributed along the guide axis of the ion guide according to an order of highest to lowest mass-to-charge ratios of the ions.

23. A method of operating a mass spectrometer to provide release of ions from an ion guide of the spectrometer, the ion guide having first and second multipole ion guide sections disposed along a guide axis of the ion guide, the second multipole ion guide section being after the first multipole ion guide section in an ejection direction along the guide axis, the ion guide further having an aperture disposed in along the guide axis after the second multipole ion guide section in the ejection direction, the method comprising:

applying an accumulation potential profile to the ion guide, the accumulation potential profile having:

an accumulation voltage applied to the second multipole ion guide section, the accumulation voltage being set to prevent the ions from exiting the ion guide along the ejection direction;

a confinement voltage applied to the first and second multipole ion guide sections, the confinement voltage being set to restrain movement of the ions in directions normal to the guide axis; and a potential gradient provided across at least one of the second multipole ion guide section and the aperture, applying a pre-ejection potential profile to the ion guide, the pre-ejection potential profile having a pre-ejection voltage applied to the first multipole ion guide section, the pre-ejection voltage being set to cause the ions to be distributed along the axis of the ion guide according to a desired sequence of mass-to-charge ratios of the ions;

applying an ejection potential profile to the ion guide, the ejection potential profile having a pseudopotential provided by an ejection voltage applied to the at least one of the second multipole ion guide section and the aperture, the ejection voltage being variable to provide for release of one or more of the ions having varying mass-to-charge ratios in a desired sequence from the ion guide along the ejection direction according to the desired sequence of such mass-to-charge ratios, wherein the same ion energy is applied to the ions over their travel through the ion guide to an extraction region disposed substantially along the guide axis irrespective of mass-to-charge ratio of the ions, and the ions are sequentially released with the same ion energy from the guide to provide for arrival of ions of substantially all released mass-to-charge ratios within the extraction region at substantially the same time.

24. The method of claim 23, wherein the one or more of the ions are released from the ion guide to an extraction electrode of the mass spectrometer with substantially the same energy irrespective of the mass-to-charge ratio of each respective one or more of the ions.

25. A mass spectrometer having an ion guide therein for the release of ions from the ion guide, comprising:

first and second multipole ion guide sections of the ion guide disposed along a guide axis of the ion guide, the second multipole ion guide section being after the first multipole ion guide section in an ejection direction along the guide axis;

an aperture of the ion guide disposed along the guide axis after the second multipole ion guide section in the ejection direction;

at least one voltage source connected to the ion guide, the at least one voltage source providing at least one of:

an accumulation voltage to the second multipole ion guide section and set to prevent the ions from exiting the ion guide along the ejection direction, a pre-ejection voltage to the first multipole ion guide section and set to cause the ions to be distributed along the axis of the ion guide according to a desired sequence of mass-to-charge ratios of the ions;

a confinement voltage to the first and second multipole ion guide sections and set to restrain movement of the ions in directions normal to the guide axis;

a potential gradient provided across the second multipole ion guide section and the aperture; and an ejection voltage to the at least one of the second multipole ion guide section and the aperture to generate a pseudopotential, the ejection voltage being variable to provide for release of one or more of the ions having varying mass-to-charge ratios in a desired sequence from the ion guide along the ejection direction according to the desired sequence of such mass-to-charge ratios, wherein the same ion energy is applied to the ions over their travel through the ion guide to an extraction region disposed substantially along the guide axis irrespective of mass-to-charge ratio of the ions, and the ions are sequentially released with the same ion energy from the guide to provide for arrival of ions of substantially all released mass-to-charge ratios within the extraction region at substantially the same time.

26. The mass spectrometer of claim 25, wherein the one or more of the ions are released from the ion guide to an extraction electrode of the mass spectrometer with substantially the same energy irrespective of the mass-to-charge ratio of each respective one or more of the ions.

* * * * *

UNITED STATES PATENT AND TRADEMARK OFFICE

CERTIFICATE OF CORRECTION

PATENT NO. : 7,456,388 B2
APPLICATION NO. : 11/122034
DATED : November 25, 2008
INVENTOR(S) : Alexandre Loboda et al.

It is certified that error appears in the above-identified patent and that said Letters Patent is hereby corrected as shown below:

On the Title page at Item (75), second line, the spelling of the name “Chernushhevich” should be --Chernushevich--.

Signed and Sealed this

Thirty-first Day of March, 2009

JOHN DOLL
*Acting Director of the United States Patent and Trademark Office*